(12) United States Patent
Asai et al.

(10) Patent No.: US 11,084,531 B2
(45) Date of Patent: Aug. 10, 2021

(54) CROSS MEMBER OF VEHICLE BODY AND METHOD OF MANUFACTURING CROSS MEMBER

(71) Applicant: TOYOTA JIDOSHA KABUSHIKI KAISHA, Toyota (JP)

(72) Inventors: Tetsuya Asai, Miyoshi (JP); Ryuichi Okumoto, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 86 days.

(21) Appl. No.: 16/396,976

(22) Filed: Apr. 29, 2019

(65) Prior Publication Data

US 2020/0023904 A1  Jan. 23, 2020

(30) Foreign Application Priority Data

Jul. 17, 2018  (JP) .............................. JP2018-133866

(51) Int. Cl.
| | |
|---|---|
| *B62D 21/03* | (2006.01) |
| *B62D 21/02* | (2006.01) |
| *B21D 51/04* | (2006.01) |
| *B21D 53/88* | (2006.01) |

(52) U.S. Cl.
CPC ............ *B62D 21/03* (2013.01); *B21D 51/04* (2013.01); *B21D 53/88* (2013.01); *B62D 21/02* (2013.01)

(58) Field of Classification Search
CPC ........ B62D 21/03; B62D 21/02; B62D 21/09; B21D 51/04; B21D 53/88; B21D 22/02; B21D 47/01; B23P 15/00; B23P 2700/50
See application file for complete search history.

(56) References Cited

U.S. PATENT DOCUMENTS

| | | | | |
|---|---|---|---|---|
| 6,915,617 | B2* | 7/2005 | Nees ..................... | B60J 5/0444 |
| | | | | 296/202 |
| 2006/0201227 | A1* | 9/2006 | Lepre .................... | B21D 53/88 |
| | | | | 72/370.14 |
| 2011/0260423 | A1* | 10/2011 | Lepre ...................... | B21C 1/24 |
| | | | | 280/124.131 |
| 2015/0004342 | A1* | 1/2015 | Saje ........................ | B60R 13/02 |
| | | | | 428/36.9 |
| 2018/0304341 | A1* | 10/2018 | Frost ..................... | B21C 23/142 |
| 2020/0079429 | A1* | 3/2020 | Asai ........................ | B62D 21/03 |
| 2020/0079430 | A1* | 3/2020 | Ikeyoshi ................ | B60D 1/485 |
| 2020/0307698 | A1* | 10/2020 | Kawai .................... | B62D 21/03 |

FOREIGN PATENT DOCUMENTS

| | | | |
|---|---|---|---|
| JP | 2000-094051 A | | 4/2000 |
| JP | 2000-168616 A | | 6/2000 |
| JP | 2007055350 A | * | 3/2007 |

* cited by examiner

*Primary Examiner* — Drew J Brown
(74) *Attorney, Agent, or Firm* — Sughrue Mion, PLLC

(57) ABSTRACT

A cross member includes a plate member. The plate member constitutes a portion of a vehicle body frame, extends in a vehicle width direction, and is formed of metal. The plate member is provided with a level difference portion on a first surface of the plate member, and a cut mark portion on a second surface of the plate member. The second surface is on the opposite side of the first surface of the plate member. The plate member is provided with a thick plate portion on a first side of the plate member in a direction in which the plate member extends, and a thin plate portion on a second side of the plate member in the direction in which the plate member extends, with the level difference portion interposed between the first and second sides.

7 Claims, 8 Drawing Sheets

CROSS MEMBER OF VEHICLE BODY AND METHOD OF MANUFACTURING CROSS MEMBER

INCORPORATION BY REFERENCE

The disclosure of Japanese Patent Application No. 2018-133866 filed on Jul. 17, 2018 including the specification, drawings and abstract is incorporated herein by reference in its entirety.

BACKGROUND

1. Technical Field

The disclosure relates to a cross member of a vehicle body and a method of manufacturing the cross member. In particular, the disclosure relates to improvement of a cross member provided with a plurality of regions different from each other in plate thickness dimension.

2. Description of Related Art

In the related art, as a vehicle body frame of a vehicle, a structure (called frame structure) that is provided with a pair of right and left side rails (also called side frames) extending in a vehicle body front-rear direction and a cross member suspended between the side rails is known. Generally, the cross member is obtained by performing press working on a metal sheet material (high-tensile strength steel sheet or like) such that the cross member has a predetermined sectional structure (for example, closed sectional structure) and a high rigidity is achieved.

Japanese Unexamined Patent Application Publication No. 2000-168616 (JP 2000-168616 A) discloses a cross member provided with a member main body that is obtained by performing press working on a metal sheet material and is configured to have a closed sectional structure.

SUMMARY

In a case where a member main body (cross member) is manufactured by performing press working on a metal sheet material (metal sheet material of which plate thickness dimension is uniform) as disclosed in JP 2000-168616 A, the plate thickness dimension of the cross member becomes uniform across the entire cross member. In addition, the plate thickness dimension is determined such that the strength of a portion of the cross member, to which a particularly large load is applied, can be secured sufficiently. Accordingly, it can be said that the plate thickness dimension of the other portions of the cross member (to which relatively small load is applied) is meaninglessly large. Therefore, there is a limit in decreasing the weight of the cross member to achieve a decrease in vehicle body weight.

As a structure for decreasing the weight of the cross member, it is conceivable to manufacture a cross member by integrally welding a plurality of panel members to each other, the panel members being different from each other in plate thickness dimension. For example, as shown in FIG. 10, a cross member a is configured by using a front side member b and a rear side member c, the members b, c are manufactured by welding a plurality of panel members b1, b2, b3, c1, c2, c3 to each other, and the members b, c are integrally welded to each other, the panel members b1, b2, b3, c1, c2, c3 being different from each other in plate thickness dimension. For example, in a case where a large load is applied to a central portion of each of the front side member b and the rear side member c in a vehicle width direction, it is possible to decrease the weight of the cross member a by making the plate thickness dimension of the panel members b2, c2 positioned at the center large and making the plate thickness dimension of the other panel members b1, b3, c1, c3 small.

However, in a case where the cross member a is manufactured as described above, the number of components is large and thus there is a possibility that the structure becomes complicated. In addition, since it is necessary to perform welding on a plurality of points, there is a possibility of an increase in manufacturing cost, heat damage of a welding point (decrease in strength of welding point), and rust (rust in vicinity of welding point).

The disclosure provides a cross member of a vehicle body and a method of manufacturing the cross member with which it is possible to achieve a decrease in weight while simplifying a structure and decreasing the number of welding points by decreasing the number of components.

A first aspect of the disclosure relates to a cross member. The cross member includes a plate member with a predetermined sectional shape. The plate member constitutes a portion of a vehicle body frame, extends in a vehicle width direction, and is formed of metal. The plate member is provided with a level difference portion on a first surface of the plate member, and a cut mark portion on a second surface of the plate member, the second surface being on the opposite side of the first surface of the plate member. The plate member is provided with a thick plate portion on a first side of the plate member in a direction in which the plate member extends, and a thin plate portion on a second side of the plate member in the direction in which the plate member extends, with the level difference portion interposed between the first and second sides.

According to the first aspect of the disclosure, the plate member is provided with the level difference portion on the first surface of the plate member, and the cut mark portion on the second surface of the plate member and thus a single plate member can be provided with the thick plate portion and the thin plate portion. That is, when manufacturing the cross member by using the plate member, it is possible to configure a portion of the cross member, to which a particularly large load is applied, as the thick plate portion and to configure a portion of the cross member, to which a relatively small load is applied, as the thin plate portion. Therefore, it is possible to achieve plate thickness dimensions corresponding to applied loads for a single plate member. As a result, it is possible to reduce a region of which the plate thickness dimension is meaninglessly large and thus it is possible to decrease the weight of the cross member. In addition, since integrally welding a plurality of panel members different from each other in plate thickness dimension is not needed (since adopting structure as shown in FIG. 10 is not needed), it is possible to achieve a decrease in number of components, structure simplification, a decrease in manufacturing cost attributable to a decrease in number of welding points, suppression of heat damage, and suppression of rust.

In the cross member according to the first aspect of the disclosure, the cross member may be positioned closest to a vehicle body rear side from among a plurality of cross members extending in the vehicle width direction and arranged at predetermined intervals in a vehicle body front-rear direction. The cross member is provided with the thick plate portion and the thin plate portion.

According to the aspect, a portion of the cross member that is positioned closest to the vehicle body rear side from among the cross members needs to have a particularly high strength in comparison with the other cross members since the cross member is connected to another vehicle (trailer or like) at the time of towing. Therefore, by configuring the portion the cross member that needs to have a high strength as the thick plate portion and configuring a nearby portion as the thin plate portion, it is possible to secure a needed strength while decreasing the weight of the cross member.

In the cross member according to the first aspect of the disclosure, the cross member positioned closest to the vehicle body rear side may be provided with a towing connection portion in a central portion of the cross member in the vehicle width direction, and the thick plate portion of the cross member may be provided with the towing connection portion and a portion in the vicinity of the towing connection portion.

According to the aspect, another vehicle (trailer or like) is generally connected to the towing connection portion provided at the central portion of the cross member in the vehicle width direction at the time of towing. Therefore, by configuring the towing connection portion and the portion in the vicinity of the towing connection portion as the thick plate portions, it is possible to achieve a sufficient strength with respect to a load input to the towing connection portion.

In the cross member according to the first aspect of the disclosure, opposite outer portions of the cross member in the vehicle width direction may be connected to a pair of right and left side rails extending in the vehicle body front-rear direction, the cross member being positioned closest to the vehicle body rear side. Each of the opposite outer portions in the vehicle width direction may be the thick plate portion.

The opposite outer portions of the cross member in the vehicle width direction are connected to the side rails such that the cross member is supported at two sides. Therefore, a stress at connection portions between the cross member and the side rails is likely to become great at the time of towing due to the influence of a moment or the like applied to the connection portions. According to the aspect, by configuring the opposite outer portions of the cross member in the vehicle width direction as the thick plate portions, it is possible to achieve a sufficient strength with respect to a load input to the opposite outer portions of the cross member in the vehicle width direction.

In the cross member according to the first aspect of the disclosure, the plate member may be a single member disposed over the entire width in the vehicle width direction.

According to the aspect, in a case where the cross member is configured to have an open sectional structure, it is possible to configure the cross member having the above-described function by using one plate member. In addition, in a case where the cross member is configured to have a closed sectional structure, it is possible to manufacture the cross member having the closed sectional structure by integrally bonding a plate member which is a vehicle body front side member and a plate member which is a vehicle body rear side member to each other. In this case, it is possible to configure the cross member having the above-described function by using two plate members. Therefore, it is possible to greatly decrease the number of components constituting the cross member (number of plate members used).

In the cross member according to the first aspect of the disclosure, the cross member may be configured to have a closed sectional structure, the first surface of the plate member provided with the level difference portion may be a surface on an inner side of the closed sectional structure, and the second surface of the plate member provided with the cut mark portion may be a surface on an outer side of the closed sectional structure.

In a case where an external force is applied to the cross member having the closed sectional structure, a tensile stress is applied to the surface on the outer side. At this time, if a level difference portion is present on the surface on the outer side, there is a possibility that the stress is concentrated on the level difference portion. According to the aspect, the surface on the inner side (first surface) is provided with the level difference portion and the surface on the outer side (second surface) is provided with the cut mark portion such that the surface on the outer side (second surface) becomes a flat surface. Accordingly, the tensile stress being concentrated on the surface on the outer side can be suppressed. As a result, it is possible to improve the reliability of the strength of the cross member.

A second aspect of the disclosure relates to a method of manufacturing a cross member which includes a plate member. The plate member constitutes a portion of a vehicle body frame, extends in a vehicle width direction, and is formed of metal. The method includes performing press working in which a first surface of the plate member is formed to have a recessed portion and a second surface of the plate member is formed to have a protruding portion; performing shaving in which the protruding portion of the second surface of the plate member is cut such that a cut mark portion is formed, after the press working; and folding the plate member such that the plate member has a predetermined sectional shape, after the shaving.

In the case of the cross member manufactured by the above-described manufacturing method, a level difference portion is formed at an outer edge of a portion of the first surface that is formed to have a recessed shape through the press working. In addition, the protruding portion on the second surface is cut through the shaving such that the cut mark portion is formed. Accordingly, the plate member is provided with the thick plate portion on the first side of the plate member in a direction in which the plate member extends, and the thin plate portion on the second side of the plate member in the direction in which the plate member extends, with the level difference portion interposed between the first and second sides.

With the cross member manufactured by the method according to the second aspect as well, it is possible to reduce a region of which the plate thickness dimension is meaninglessly large and it is possible to achieve a decrease in weight. In addition, since integrally welding a plurality of panel members different from each other in plate thickness dimension is not needed, it is possible to achieve a decrease in number of components, structure simplification, a decrease in manufacturing cost attributable to a decrease in number of welding points, suppression of heat damage, and suppression of rust.

According to the aspects of the disclosure, the plate member is provided with the level difference portion on the first surface of the plate member, and the cut mark portion on the second surface of the plate member, and thereby the plate member is provided with the thick plate portion on the first side of the plate member in the direction in which the plate member extends, and the thin plate portion on the second side of the plate member in the direction in which the plate member extends, with the level difference portion interposed between the first and second sides. Therefore, it is possible to reduce a region of which the plate thickness dimension is meaninglessly large and thus it is possible to decrease the weight of the cross member. In addition, since integrally welding a plurality of panel members different from each other in plate thickness dimension is not needed, it is possible to achieve a decrease in number of components, structure simplification, a decrease in manufacturing cost attributable to a decrease in number of welding points, suppression of heat damage, and suppression of rust.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Hereinafter, an embodiment will be described based on drawings. In the present embodiment, a case where an aspect of the disclosure is applied to a cross member of a vehicle body frame configured as a so-called rudder frame will be described.

Schematic Structure of Vehicle Body Frame

Figure 1:
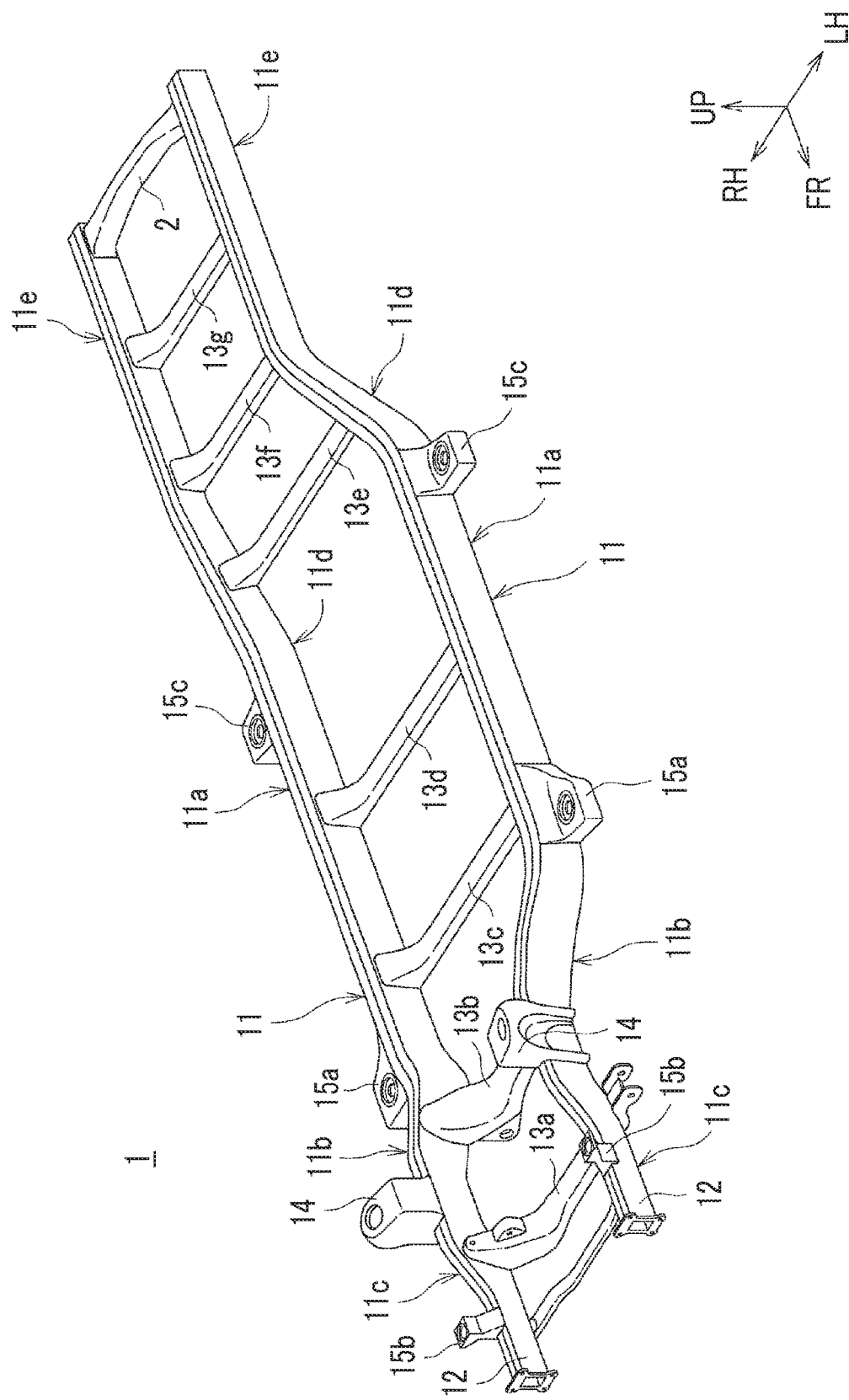
FIG. 1 is a perspective view illustrating a vehicle body frame according to an embodiment.

FIG. 1 is a perspective view illustrating a vehicle body frame 1 according to the present embodiment. In FIG. 1, an arrow FR represents a direction toward a front side of a vehicle body, an arrow UP represents an upward direction, an arrow RH represents a direction toward a right side of the vehicle body, and an arrow LH represents a direction toward a left side of the vehicle body.

As illustrated in FIG. 1, the vehicle body frame 1 is provided with a pair of right and left side rails 11 extending in a vehicle body front-rear direction, the side rails 11 being on opposite outer sides in a vehicle width direction. The side rails 11 have closed sectional structures and are provided with intermediate portions 11a, front kick portions 11b, front portions 11c, rear kick portions 11d, and rear portions 11e that are continuous with each other in the vehicle body front-rear direction.

The intermediate portion 11a extends in a horizontal direction along the vehicle body front-rear direction in a predetermined area between positions on which front wheels (not shown) are provided and positions on which rear wheels (not shown) are provided.

The front kick portion 11b is continuous with a front end of the intermediate portion 11a and has a shape that is upwardly curved toward a vehicle body front side. The front portion 11c is continuous with a front end of the front kick portion 11b and extends toward the vehicle body front side. The front wheels are provided outward of the front portions 11c in the vehicle width direction. Therefore, dimensions of the front portions 11c of the side rails 11 in the vehicle width direction (dimension between right and left front portions 11c) are set to be smaller than dimensions of the intermediate portions 11a in the vehicle width direction (dimension between right and left intermediate portions 11a) in consideration of interference between the front portions 11c and the front wheels. Therefore, each of the front kick portions 11b has a shape that is outwardly curved in the vehicle width direction toward a vehicle body rear side.

The rear kick portion 11d is continuous with a rear end of the intermediate portion 11a and has a shape that is upwardly curved toward the vehicle body rear side. The rear portion 11e is continuous with a rear end of the rear kick portion 11d and extends toward the vehicle body rear side. The rear wheels are provided outward of the rear portions 11e in the vehicle width direction. Therefore, dimensions of the rear portions 11e of the side rails 11 in the vehicle width direction (dimension between right and left rear portions 11e) are set to be smaller than dimensions of the intermediate portions 11a in the vehicle width direction (dimension between right and left intermediate portions 11a) in consideration of interference between the rear portions 11e and the rear wheels. Therefore, each of the rear kick portions 11d has a shape that is outwardly curved in the vehicle width direction toward the vehicle body front side.

The front portions 11c of the right and left side rails 11 are provided with a pair of right and left crash boxes 12 for absorbing energy (collision load) at the time of a vehicle frontal collision. Front end portions of the right and left crash boxes 12 are provided with bumper reinforcements (not shown) that extend in the vehicle width direction.

A plurality of cross members 13a, 13b, 13c, 13d, 13e, 13f, 13g, 2 extending in the vehicle width direction is suspended between the side rails 11.

Metal suspension mount brackets 14 protruding outward in the vehicle width direction are provided on positions on the front portions 11c of the side rail 11 between the cross member 13a and the cross member 13b.

In addition, a rear end portion of the front kick portion 11b of the side rail 11, a front end portion of the front portion 11c of the side rail 11, and a front end portion of the rear kick portion 11d of the side rail 11 are provided with cab mount brackets 15a, 15b, 15c, respectively. The cab mount brackets 15a, 15b, 15c protrude outward in the vehicle width direction and cab mounts (not shown) are attached thereto. In addition, a cabin (not shown) can be connected to the side rails 11 via the cab mounts and the cab mount brackets 15a, 15b, 15c.

Structure of Cross Member

The feature of the present embodiment is the structure of the rear cross member (RR cross member) 2 that is positioned closest to the vehicle body rear side from among the cross members 13a, 13b, 13c, 13d, 13e, 13f, 13g, 2. That is, the rear cross member 2 is an example of the cross member. Hereinafter, the rear cross member 2 will be described.

Figure 2:
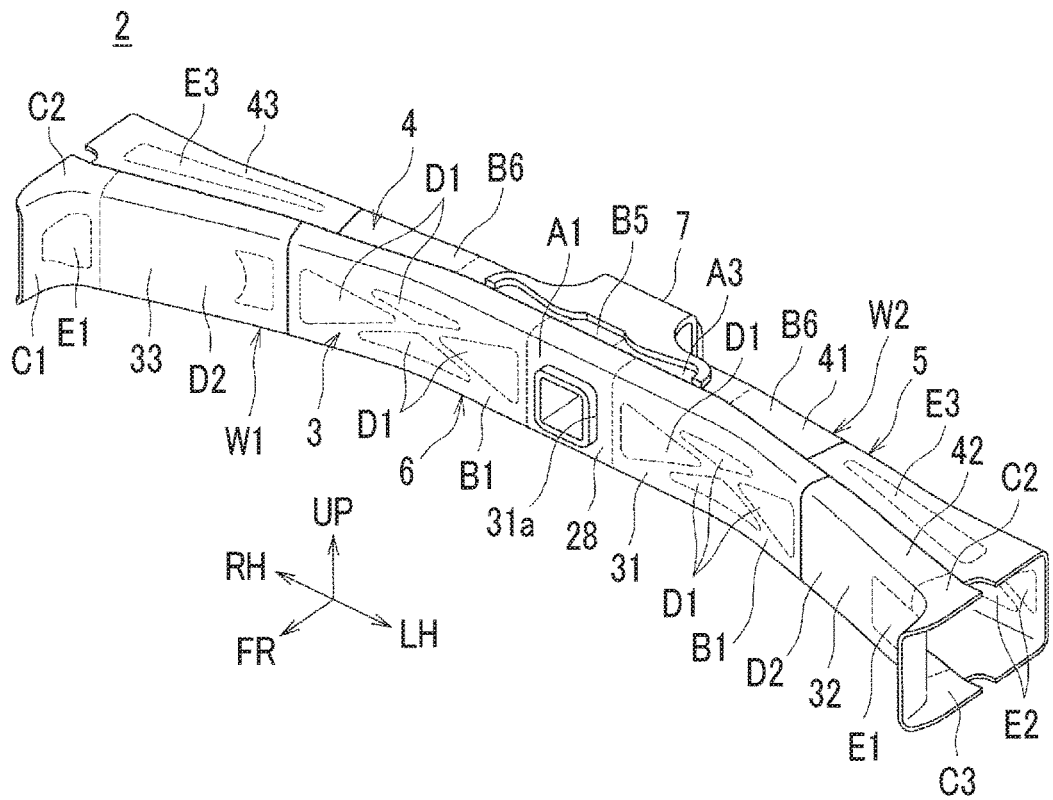
FIG. 2 is a perspective view of a rear cross member as seen from an upper left side of a vehicle body front portion.
Figure 3:
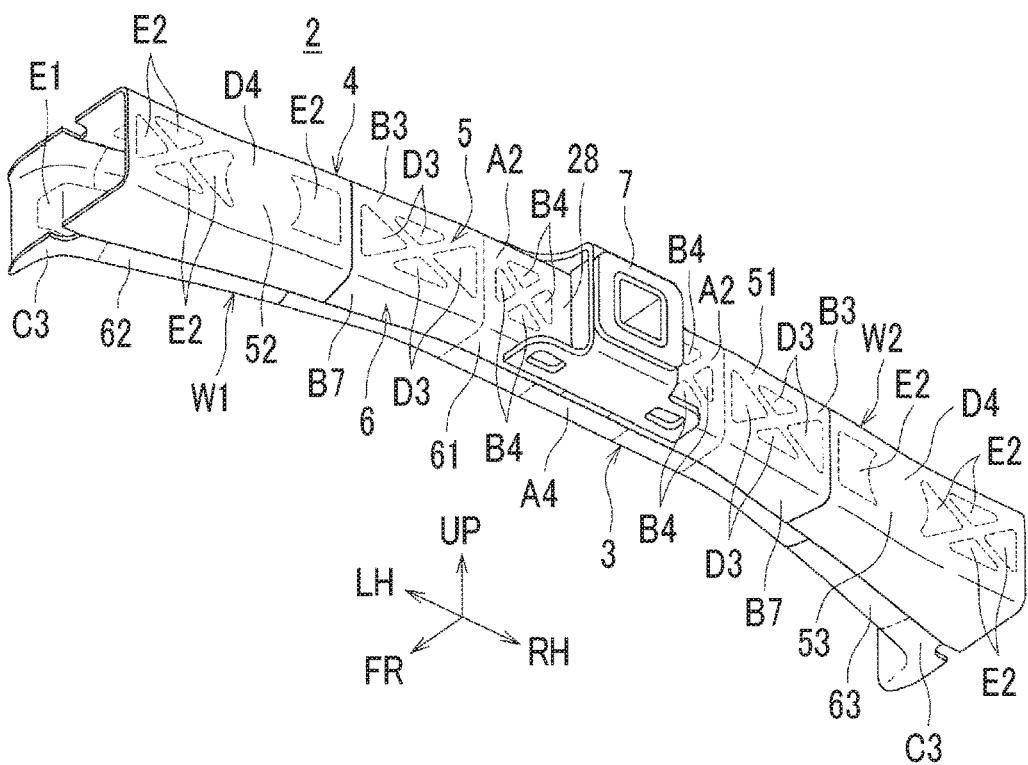
FIG. 3 is a perspective view of the rear cross member as seen from a lower left side of a vehicle body rear portion.
Figure 4:
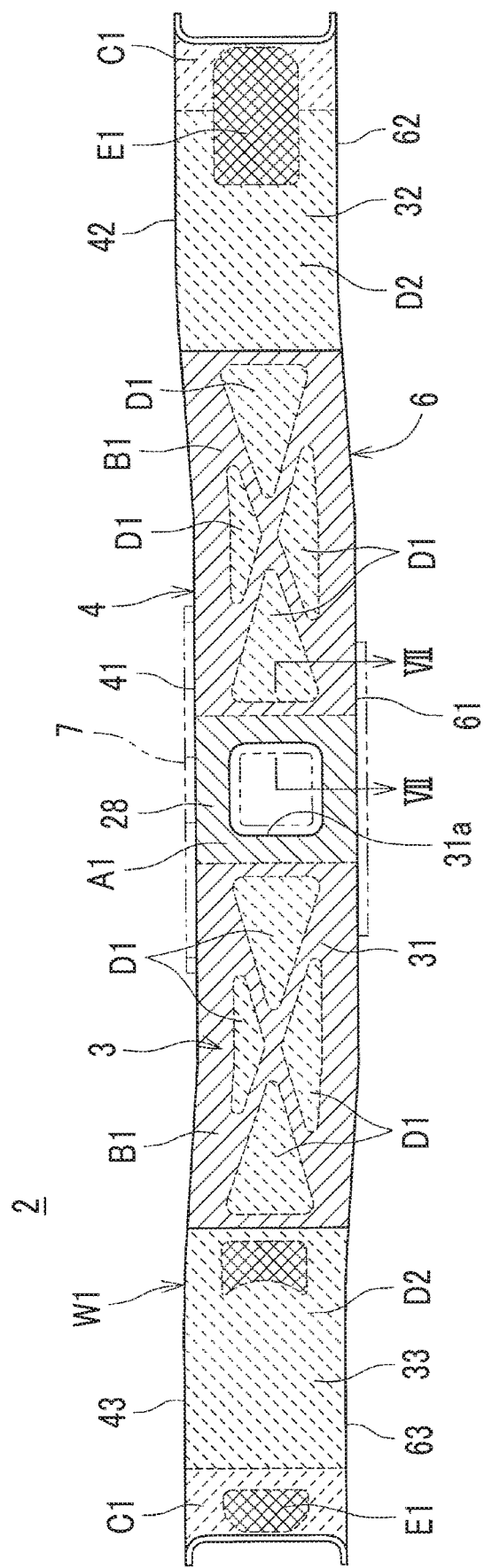
FIG. 4 is a front view of the rear cross member.
Figure 5:
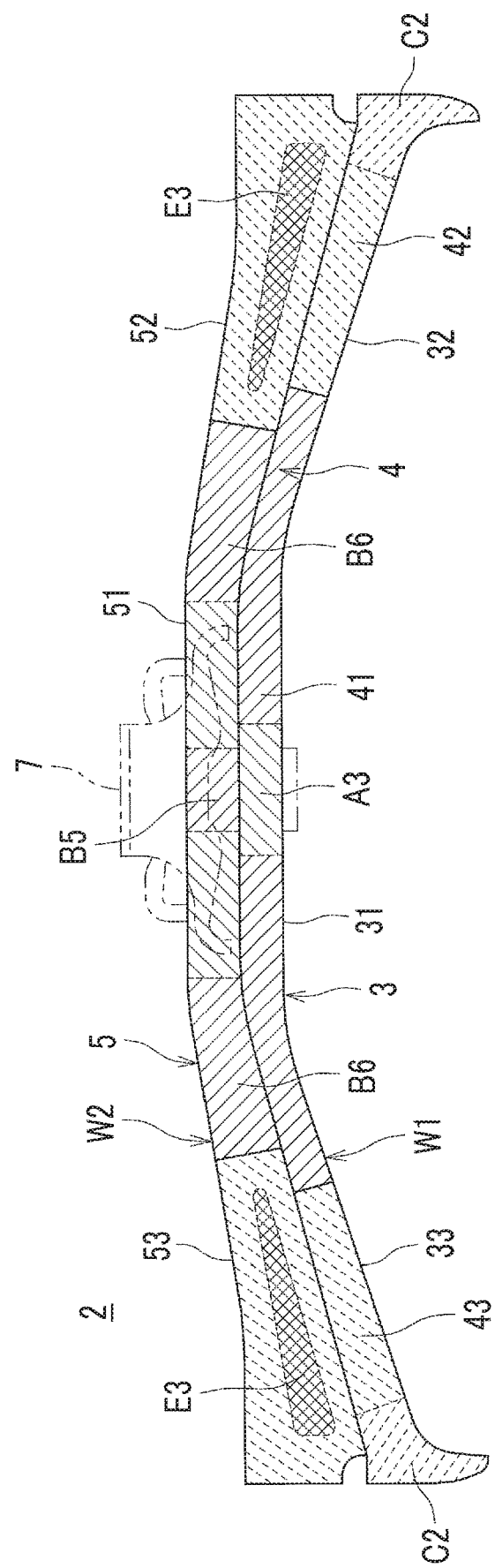
FIG. 5 is a plan view of the rear cross member.
Figure 6:
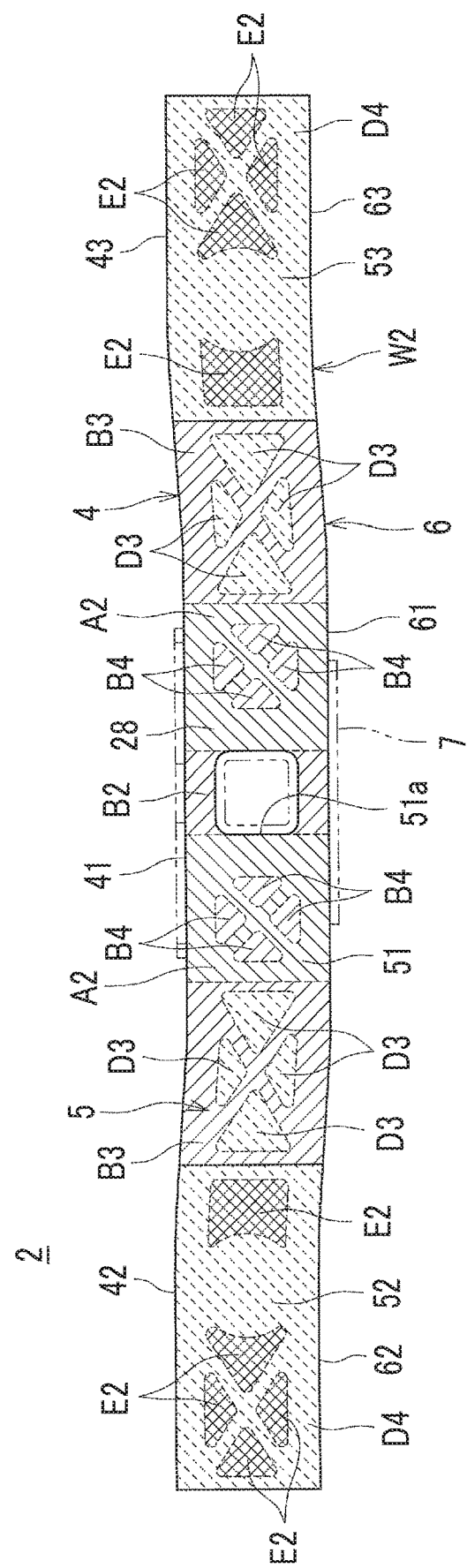
FIG. 6 is a rear view of the rear cross member.
Figure 7:
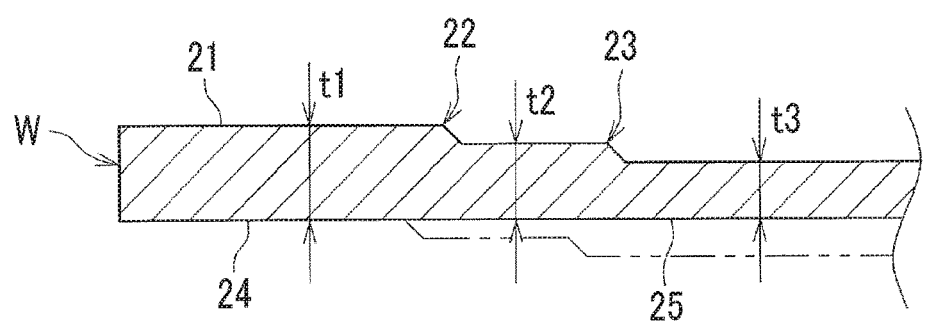
FIG. 7 is a sectional view taken along line VII-VII in FIG. 4.

FIG. 2 is a perspective view of the rear cross member 2 as seen from an upper left side of a vehicle body front portion. FIG. 3 is a perspective view of the rear cross member 2 as seen from a lower left side of a vehicle body rear portion. FIG. 4 is a front view of the rear cross member 2. FIG. 5 is a plan view of the rear cross member 2. FIG. 6 is a rear view of the rear cross member 2. FIG. 7 is a sectional view taken along line VII-VII in FIG. 5. In FIGS. 2 and 3, the arrow FR represents a direction toward the front side of the vehicle body, the arrow UP represents an upward direction, the arrow RH represents a direction toward the right side of the vehicle body, and the arrow LH represents a direction toward the left side of the vehicle body.

The rear cross member 2 is configured by welding two plate members W1, W2 and is configured to have a closed sectional structure ("predetermined sectional shape") and to have a rectangular section. That is, the rear cross member 2 is provided with a front wall portion 3 that is positioned close to the vehicle body front side, an upper plate portion 4 that extends toward the vehicle body rear side from an upper edge of the front wall portion 3, a rear wall portion 5 that extends downward from a rear edge (edge on rear side in vehicle body front-rear direction) of the upper plate portion 4, and a lower plate portion 6 that extends toward the vehicle body front side from a lower edge of the rear wall portion 5. Accordingly, the front wall portion 3 and the rear wall portion 5 face each other in the vehicle body front-rear direction. In addition, the upper plate portion 4 and the lower plate portion 6 face each other in a vertical direction.

A central portion of the front wall portion 3 in the vehicle width direction extends in the vehicle width direction. Hereinafter, a portion as described above will be referred to as a front wall central portion 31. A rectangular opening 31a for insertion of a towing receiver 7 (illustrated by virtual line in FIGS. 4 to 6) is formed in the front wall central portion 31. A central portion of the rear wall portion 5 in the vehicle width direction also extends in the vehicle width direction. Hereinafter, a portion as described above will be referred to as a rear wall central portion 51. A rectangular opening 51a for insertion of the towing receiver 7 is also formed in the rear wall central portion 51. Portions in the vicinity of the rectangular openings 31a, 51a for insertion of the towing receiver 7 will be referred to as towing connection portions 28.

In addition, a region on the upper plate portion 4 that is positioned between the front wall central portion 31 and the rear wall central portion 51 will be referred to as an upper plate central portion 41. A front end and a rear end of the upper plate central portion 41 extend in the vehicle width direction. In addition, a region on the lower plate portion 6 that is positioned between the front wall central portion 31 and the rear wall central portion 51 will be referred to as a lower plate central portion 61. A front end and a rear end of the lower plate central portion 61 also extend in the vehicle width direction.

In addition, a portion of the front wall portion 3 that is positioned outward of the front wall central portion 31 in the vehicle width direction is inclined toward the vehicle body front side in a direction toward an outer side in the vehicle width direction. Hereinafter, portions as described above will be referred to as front wall inclined portions 32, 33. A portion of the rear wall portion 5 that is positioned outward of the rear wall central portion 51 in the vehicle width direction is also inclined toward the vehicle body front side in a direction toward the outer side in the vehicle width direction. Hereinafter, portions as described above will be referred to as rear wall inclined portions 52, 53.

In addition, regions on the upper plate portion 4 that are positioned between the front wall inclined portions 32, 33 and the rear wall inclined portions 52, 53 will be referred to upper plate outer portions 42, 43. In addition, regions on the lower plate portion 6 that are positioned between the front wall inclined portions 32, 33 and the rear wall inclined portions 52, 53 will be referred to lower plate outer portions 62, 63.

Plate Thickness Dimension of Rear Cross Member

The feature of the rear cross member 2 is that the rear cross member 2 is provided with a plurality of regions different from each other in plate thickness dimension. In the present embodiment, the rear cross member 2 is provided with five kinds of regions different from each other in plate thickness dimension. Regions that are largest in plate thickness dimension will be referred to as first regions A (regions A1 to A4 in FIGS. 2 to 6), regions that are second largest in plate thickness dimension will be referred to as second regions B (regions B1 to B7 in FIGS. 2 to 6), regions that are third largest in plate thickness dimension will be referred to as third regions C (regions C1 to C3 in FIGS. 2 to 6), regions that are fourth largest in plate thickness dimension will be referred to as fourth regions D (regions D1 to D4 in FIGS. 2 to 6), and regions that are smallest in plate thickness dimension will be referred to as fifth regions E (regions E1 to E3 in FIGS. 2 to 6).

As a structure for providing a plurality of regions different from each other in plate thickness dimension, specifically, a surface ("first surface of plate member") 21 on an inner side of the closed sectional structure of the rear cross member 2 is partially recessed such that level difference portions 22, 23 are provided while a surface 24 on an outer side of the closed sectional structure is approximately flat as illustrated in FIG. 7 (sectional view taken along line VII-VII in FIG. 4). Therefore, the regions different from each other in plate thickness dimension are provided since the recess dimension of the surface 21 on the inner side is uneven. In other words, a plate thickness dimension is determined by a dimension (dimensions t1, t2, t3 in FIG. 7) between a region of the surface 21 on the inner side that is lowered in level by means of the level difference portions 22, 23 and the surface 24 on the outer side and the larger the recess dimension of a region is (larger degree to which region is lowered in level by means of level difference portions 22, 23 is), the smaller the plate thickness dimension of the region is. Therefore, the first side of the plate member W in a direction in which the plate member W extends (portion that is slightly lowered in level by means of level difference portions 22, 23) is a region ("thick plate portion") that is relatively large in plate thickness dimension and the second side of the plate member W in the direction in which the plate member W extends (portion that is greatly lowered in level by means of level difference portions 22, 23) is a region ("thin plate portion") that is relatively small in plate thickness dimension, with the level difference portions 22, 23 interposed between the first and second sides.

The number of the level difference portions 22, 23 is two in FIG. 7. Therefore, a region positioned right to the level difference portion 22, which is on the left side in FIG. 7, and a region positioned left to the level difference portion 22 are different from each other in plate thickness dimension. With regard to the level difference portion 22, the region positioned left to the level difference portion 22 is a thick plate portion (portion having plate thickness dimension t1) and the region positioned right to the level difference portion 22 is a thin plate portion (portion having plate thickness dimension t2). In addition, a region positioned right to the level difference portion 23, which is on the right side in FIG. 7, and a region positioned left to the level difference portion 23 are also different from each other in plate thickness dimension. With regard to the level difference portion 23, the region positioned left to the level difference portion 23 is a thick plate portion (portion having plate thickness dimension t2) and the region positioned right to the level difference portion 23 is a thin plate portion (portion having plate thickness dimension t3).

As described above, in the present embodiment, the aspect of the disclosure is applied to the rear cross member 2 positioned closest to the vehicle body rear side and thus the rear cross member 2 positioned closest to the vehicle body rear side is provided with the thick plate portion and the thin plate portion.

As a manufacturing method for providing the level difference portions 22, 23 with the surface 21 on the inner side of the closed sectional structure of the rear cross member 2 partially recessed and making the surface 24 on the outer side of the closed sectional structure flat, press working and shaving are performed on the plate member W. Although details will be described later, after press working in which a first surface (surface 21 on inner side of closed sectional structure) of the plate member W is formed to have a recessed portion and a second surface (surface 24 on outer side of closed sectional structure) of the plate member W is formed to have a protruding portion (virtual line in FIG. 7 shows shape of plate member W after press working), shaving in which a protruding portion of the second surface (surface 24 on outer side of closed sectional structure) is cut (solid line in FIG. 7 shows shape of plate member W after shaving) is performed such that the second surface (surface 24 on outer side of closed sectional structure) is made approximately flat. That is, recess portions of the first surface (surface 21 on inner side of closed sectional structure) are not removed such that the level difference portions 22, 23 are provided and the protruding portion of the second surface (surface 24 on outer side of closed sectional structure) is cut such that the second surface is made approximately flat. Accordingly, the above-described regions different from each other in plate thickness dimension is formed on one plate member W.

In a case where the plate member W is processed as described above, in the second surface 24, a cut mark portion 25 (cut mark portion provided on second surface 24 of plate member W which is rear surface of region lowered in level by means of level difference portions 22, 23) is provided on a portion of the second surface 24 since the protruding portion is cut due to the shaving. The cut mark portion 25 is a portion at which a cut section of the cut protruding portion is exposed and the shape of a surface (gloss of surface or surface roughness) of the cut mark portion 25 is obviously different from that of another portion (portion which is not cut). For example, in a case where a surface treatment is performed on the plate member W, a surface treatment layer is removed. In addition, in a case where there is an oxide film present on a surface of the plate member W, the oxide film is removed. In addition, in some cases, a small edge remains on an outer edge portion of the cut mark portion 25. In addition, the cut mark portion 25 may not be flat to be completely flush with another portion and the cut mark portion 25 may have a shape projecting to be slightly higher than the other portion (by 0.1 mm, for example).

In FIGS. 4 to 6, the regions different from each other in plate thickness dimension are hatched for distribution. Specifically, the first regions A (A1 to A4 in FIGS. 4 to 6) are hatched with solid lines inclined toward a lower left side. The second regions B (B1 to B7 in FIGS. 4 to 6) are hatched with solid lines inclined toward an upper right side. The third regions C (C1 to C3 in FIGS. 4 to 6) are hatched with broken lines inclined toward the upper right side. The fourth regions D (D1 to D4 in FIGS. 4 to 6) are hatched with broken lines inclined toward the lower left side. The fifth regions E (E1 to E3 in FIGS. 4 to 6) are hatched with solid lines in a lattice shape. The plate thickness dimensions of the regions A to E are as follows, for example. The plate thickness dimension of the first regions A (A1 to A4) is 5.0 mm, the plate thickness dimension of the second regions B (B1 to B7) is 4.0 mm, the plate thickness dimension of the third regions C (C1 to C3) is 3.5 mm, the plate thickness dimension of the fourth regions D (D1 to D4) is 3.0 mm, and the plate thickness dimension of the fifth regions E (E1 to E3) is 2.5 mm. The values described above are not limited thereto.

Application Point of Each Region

Next, application points of each of the regions A to E will be described.

Application points of the first regions A (regions that are largest in plate thickness dimension from among regions A to E) are as follows.

The vicinity of the opening 31a formed in a central portion of the front wall central portion 31 (portion to which reference symbol "A1" is assigned)

Opposite outer portions in the vehicle width direction that are positioned outward of the opening 51a formed in a central portion of the rear wall central portion 51 (portions to which reference symbol "A2" is assigned)

A central portion of the upper plate central portion 41 (portion to which reference symbol "A3" is assigned)

A central portion of the lower plate central portion 61 (portion to which reference symbol "A4" is assigned)

Application points of the second regions B (regions that are second largest in plate thickness dimension from among regions A to E) are as follows.

Regions of the front wall central portion 31 that extend from outer portions of an application point of the first region A in the vehicle width direction to inner portions (portions positioned inward of central portions of front wall inclined portions 32, 33 in vehicle width direction) of the front wall inclined portions 32, 33 in the vehicle width direction (portions to which reference symbol "B1" is assigned)

The vicinity of the opening 51a formed in the central portion of the rear wall central portion 51 (portion to which reference symbol "B2" is assigned)

Regions of the rear wall central portion 51 that extend from outer portions of an application point of the first region A in the vehicle width direction to inner portions (portions positioned inward of central portions of rear wall inclined portions 52, 53 in vehicle width direction) of the rear wall inclined portions 52, 53 in the vehicle width direction (portions to which reference symbol "B3" is assigned)

Four regions provided in each of the first regions A of the rear wall central portion 51 (portions to which reference symbol "B4" is assigned)

A central portion of the upper plate central portion 41 (portion to which reference symbol "B5" is assigned)

Regions of the upper plate central portion 41 that extend from outer portions of an application point of the first region A in the vehicle width direction to inner portions (portions positioned inward of central portions of upper plate outer portions 42, 43 in vehicle width direction) of the upper plate outer portions 42, 43 in the vehicle width direction (portions to which reference symbol "B6" is assigned)

Regions of the lower plate central portion 61 that extend from outer portions of an application point of the first region A in the vehicle width direction to inner portions (portions positioned inward of central portions of lower plate outer portions 62, 63 in vehicle width direction) of the lower plate outer portions 62, 63 in the vehicle width direction (portions to which reference symbol "B7" is assigned)

Application points of the third regions C (regions that are third largest in plate thickness dimension from among regions A to E) are as follows.

Outer portions of the front wall inclined portions 32, 33 in the vehicle width direction (portions to which reference symbol "C1" is assigned)

Outer portions of the upper plate outer portions 42, 43 in the vehicle width direction (portions to which reference symbol "C2" is assigned)

Outer portions of the lower plate outer portions 62, 63 in the vehicle width direction (portions to which reference symbol "C3" is assigned) Application points of the fourth regions D (regions that are fourth largest in plate thickness dimension from among regions A to E) are as follows.

Four regions provided in each of the second regions B of the front wall portion 3 (portions to which reference symbol "D1" is assigned)

Portions of the front wall inclined portions 32, 33 that are positioned outward of application points of the second regions B in the vehicle width direction (portions to which reference symbol "D2" is assigned)

Four regions provided in each of the second regions B of the rear wall portion 5 (portions to which reference symbol "D3" is assigned)

Portions of the rear wall inclined portions 52, 53 that are positioned outward of application points of the second regions B in the vehicle width direction (portions to which reference symbol "D4" is assigned)

Application points of the fifth regions E (regions that are smallest in plate thickness dimension from among regions A to E) are as follows.

Outer portions of the front wall inclined portions 32, 33 in the vehicle width direction (portions to which reference symbol "E1" is assigned)

Five regions provided in each of the fourth regions D of the rear wall inclined portions 52, 53 (portions to which reference symbol "E2" is assigned)

A region provided in each of the fourth regions D of the upper plate outer portions 42, 43 (portions to which reference symbol "E3" is assigned)

As described above, in the case of the rear cross member 2, the plate thickness dimensions of regions near the openings 31a, 51a for insertion of the towing receiver 7 (in particular, towing connection portion 28 of front wall central portion 31) are larger than the plate thickness dimensions of the other regions.

Figure 8:
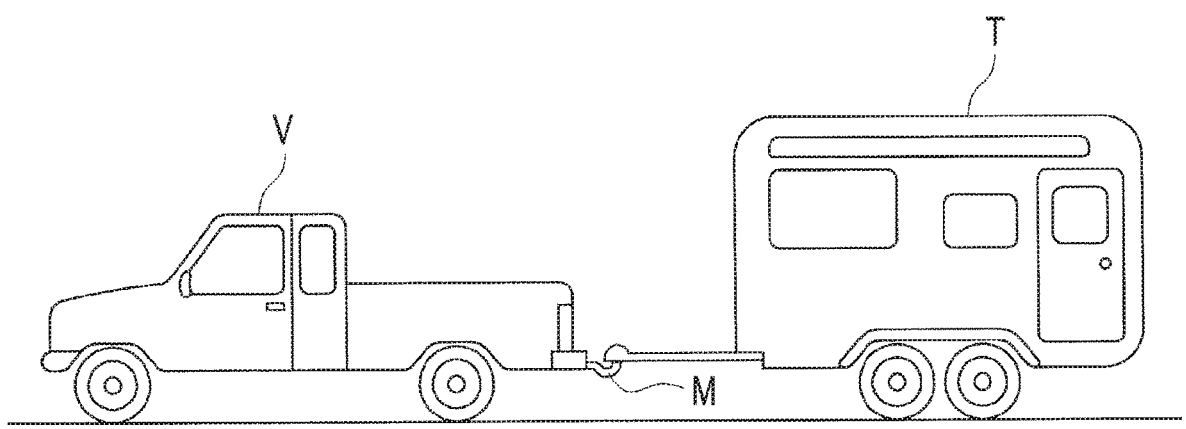
FIG. 8 is a view illustrating a towing state of a vehicle.

FIG. 8 illustrates a towing state of a vehicle V. At the time of towing performed by the vehicle V as shown in the drawing, another vehicle (trailer or like) T is connected to the towing receiver 7 via a ball mounting M. That is, the other vehicle T is connected to the towing connection portion 28 via the towing receiver 7 (refer to FIGS. 2 and 3) and the ball mounting M. Therefore, a large load is applied to the towing connection portion 28. However, since the plate thickness dimensions of the towing connection portion 28 and a portion in the vicinity thereof are larger than the plate thickness dimensions of the other regions (since towing connection portion 28 is thick plate portion), the strength of the central portion in the vehicle width direction (towing connection portion 28), to which a relatively large load is input at the time of towing and at which a stress is likely to become great, can be made great and thus it is possible to achieve a sufficient strength with respect to a load input at the time of towing.

In addition, at the time of towing, since opposite outer portions of the rear cross member 2 in the vehicle width direction are connected to the side rails 11, a stress is likely to become great due to the influence of a moment or the like applied to connection portions between the rear cross member 2 and the side rails 11. However, since the plate thickness dimensions of the opposite outer portions in the vehicle width direction are great (since opposite outer portions are set as third regions C), the strength of the opposite outer portions in the vehicle width direction can be made great and thus it is possible to achieve a sufficient strength with respect to a load input to the opposite outer portions in the vehicle width direction.

Rear Cross Member Manufacturing Step

Next, a manufacturing step of the rear cross member 2 configured as described above will be described.

As the manufacturing step of the rear cross member 2, a press working step of the plate member (for example, high-tensile strength steel sheet) W, a shaving step of the plate member W, a folding step of the plate member W, and a bonding step of the two plate members W1, W2 are performed sequentially.

FIGS. 9A to 9D are views for schematically describing the manufacturing step of the rear cross member 2.

Figure 9A:
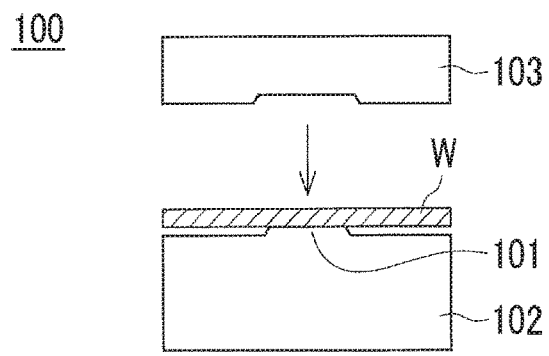
FIG. 9A is a view for schematically describing a rear cross member manufacturing step.

First, the plate member W sheared into a predetermined shape (long shape) by a shearing machine (not shown) is set on a pressing machine 100 (refer to FIG. 9A). The pressing machine 100 is provided with a base table 102 in which a punch 101 is installed on an upper surface and a die 103 that can be raised and lowered with respect to the base table 102. A mechanism for raising and lowering the die 103 is the same as that of a pressing machine in the related art and thus description thereof will be omitted.

Figure 9B:
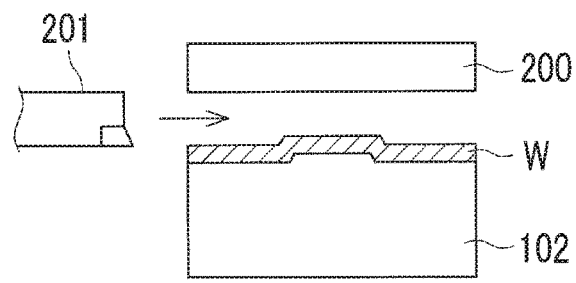
FIG. 9B is a view for schematically describing the rear cross member manufacturing step.

Then, the die 103 is lowered toward the plate member W placed on the base table 102 (press working step) such that a recess portion is formed on a lower surface of the plate member W and a protruding portion is formed on an upper surface of the plate member W (refer to FIG. 9B). The recess portion obtained through the press working step constitutes the level difference portions 22, 23 in the future.

In addition, the recess dimension of the recess portion is set to be smaller than the plate thickness dimension of the plate member W. In addition, the recess dimension of the recess portion is set according to a plate thickness dimension (target plate thickness dimension) to be obtained through the shaving step, which will be described later. That is, the protruding dimension of a protruding portion of the punch 101 and the recess dimension of a recess portion of the die 103 are set such that the larger the target plate thickness dimension is, the smaller the recess dimension of the recess portion is.

Figure 9C:
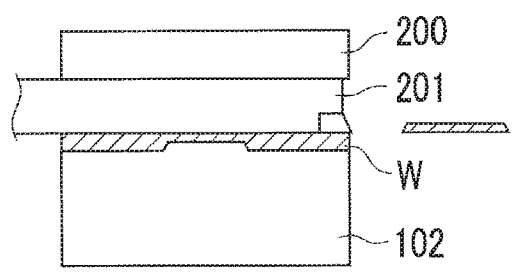
FIG. 9C is a view for schematically describing the rear cross member manufacturing step.

Thereafter, the shaving step of the plate member W subjected to the press working is performed. In the shaving step, the upper surface of the plate member W is cut into an approximately flat shape. Specifically, a pressing jig 200 is disposed instead of the die 103 in a state where the plate member W subjected to the press working is placed on the base table 102. A lower surface of the pressing jig 200 is a flat surface. In addition, a space is present between the pressing jig 200 and the base table 102 such that a tool (cutting blade) 201 for the shaving can pass through a space between the pressing jig 200 and the plate member W. As illustrated in FIG. 9C, the cutting blade 201 is caused to pass through the space such that the protruding portion of the plate member W is cut and the upper surface of the plate member W becomes a flat surface.

Regarding the plate member W obtained through the shaving step, a region cut by the cutting blade 201 is processed into a thin plate portion and the other portion is processed into a thick plate portion.

In FIGS. 9A to 9D, a case where the central portion of the plate member W is processed into the thin plate portion and an outer portion is processed into the thick plate portion has been described for simplicity of description. However, as described above, the actual rear cross member 2 is provided with the five kinds of regions different from each other in plate thickness dimension. Therefore, the punch 101 and the die 103 are manufactured such that the plate thickness dimensions can be obtained and a plurality of protruding portions manufactured in the press working step is cut by the cutting blade 201.

Figure 9D:
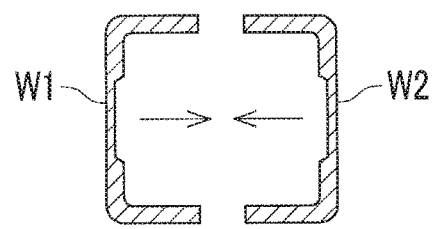
FIG. 9D is a view for schematically describing the rear cross member manufacturing step.

After two plate members W (front plate member W1 constituting front side of rear cross member 2 and rear plate member W2 constituting rear side of rear cross member 2) provided with regions different from each other in plate thickness dimension are manufactured as described above, each of the plate members W is formed into a U-shape through press working or the like (folding step), and edges of the plate members W are welded to each other (bonding step) through butt welding as illustrated in FIG. 9D such that an approximately rectangular closed section is achieved.

Effect of Embodiment

Figure 10:
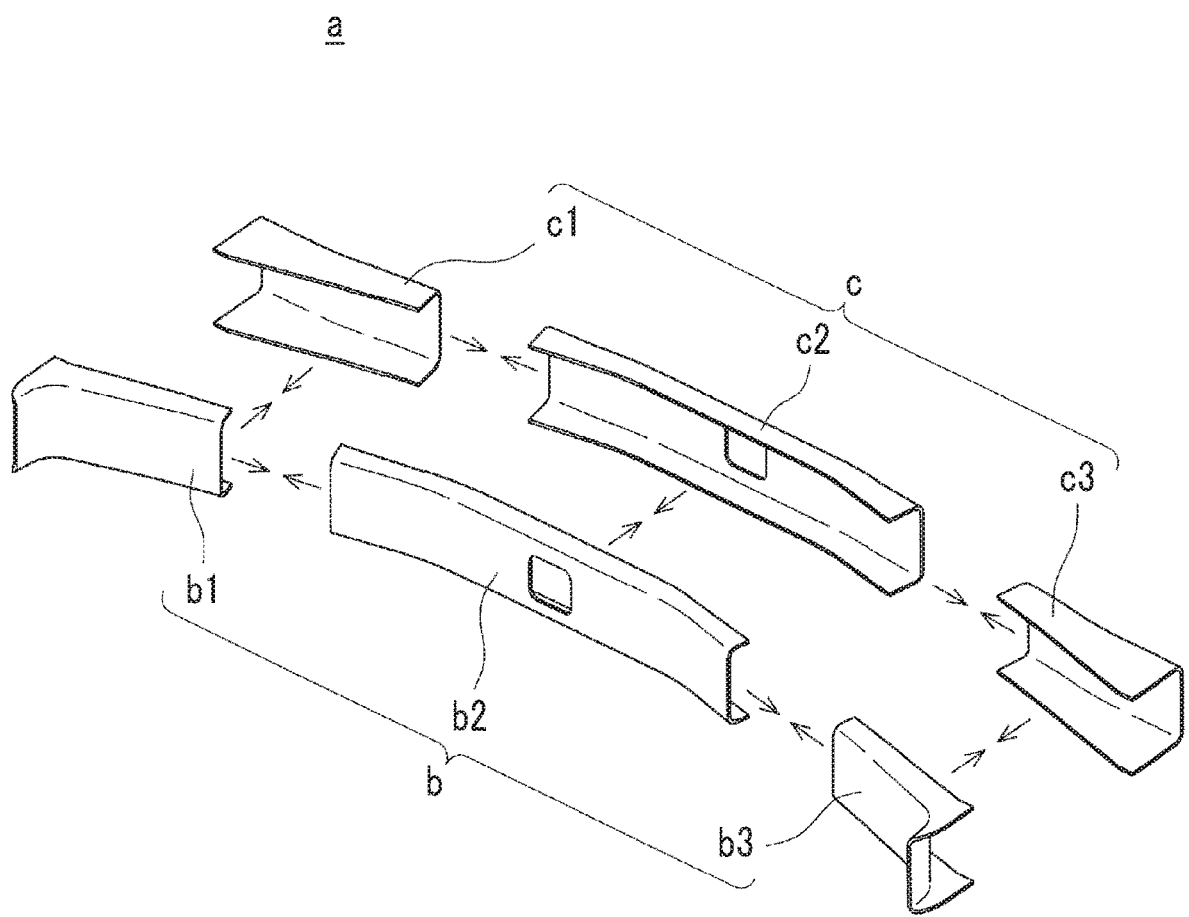
FIG. 10 is a perspective view for describing a case where a cross member is manufactured by integrally welding a plurality of panel members different from each other in plate thickness dimension.

As described above, in the present embodiment, the first surface of the plate member W (surface on inner side of closed sectional structure) 21 is provided with the level difference portions 22, 23 and the second surface (surface on outer side of closed sectional structure) 24 is provided with the cut mark portion 25 such that a single plate member W is provided with a thick plate portion and a thin plate portion. That is, when manufacturing the rear cross member 2 by using the plate member W, it is possible to configure a portion of the rear cross member 2, to which a particularly large load is applied, as the thick plate portion and to configure a portion of the rear cross member 2, to which a relatively small load is applied, as the thin plate portion. Therefore, it is possible to achieve plate thickness dimensions corresponding to applied loads for a single plate member W. Specifically, the towing connection portion 28 provided in the central portion of the rear cross member 2 in the vehicle width direction, the vicinity of the towing connection portion 28, and the opposite outer portions of the rear cross member 2 in the vehicle width direction which are connected to the side rails 11 can be configured as thick plate portions which are greater than nearby portions in plate thickness dimension. As a result, it is possible to reduce a region of which the plate thickness dimension is meaninglessly large and thus it is possible to decrease the weight of the rear cross member 2. In addition, since integrally welding a plurality of panel members different from each other in plate thickness dimension is not needed (since adopting structure as shown in FIG. 10 is not needed), it is possible to achieve a decrease in number of components, structure simplification, a decrease in manufacturing cost attributable to a decrease in number of welding points, suppression of heat damage, and suppression of rust.

In addition, in the present embodiment, each of the plate members W1, W2 is configured as a single member disposed over the entire width in the vehicle width direction. Therefore, it is possible to configure the rear cross member 2 by using the two plate members W1, W2 solely and it is possible to greatly decrease the number of components constituting the rear cross member 2 (number of plate members W1, W2 used). In addition, in a case where the rear cross member 2 is configured to have an open sectional structure, it is also possible to configure the rear cross member 2 by using one plate member W.

In addition, in the present embodiment, the surface 21 on the inner side of the closed sectional structure of the rear cross member 2 is provided with the level difference portions 22, 23 and the surface 24 on the outer side is provided with the cut mark portion 25 such that the surface 24 is made approximately flat. In a case where an external force is applied to the rear cross member 2 having the closed sectional structure, a tensile stress is applied to the surface 24 on the outer side. At this time, if a level difference portion is present on the surface 24 on the outer side, there is a possibility that the stress is concentrated on the level difference portion. In the present embodiment, the surface 21 on the inner side is provided with the level difference portions 22, 23 and the surface 24 on the outer side is provided with the cut mark portion 25 such that the surface 24 on the outer side becomes a flat surface. Accordingly, the tensile stress being concentrated on the surface 24 on the outer side can be suppressed. As a result, it is possible to improve the reliability of the strength of the rear cross member 2.

OTHER EMBODIMENTS

Note that, the aspect of the disclosure is not limited to the above-described embodiment and all modifications and applications can be made within the scope of the claims and equivalents thereof.

For example, in the above-described embodiment, a case where the aspect of the disclosure is applied to the rear cross member 2 positioned closest to the vehicle body rear side from among the cross members 13a, 13b, 13c, 13d, 13e, 13f, 13g, 2 has been described. The aspect of the disclosure is not limited thereto and may be applied to the other cross members 13a, 13b, 13c, 13d, 13e, 13f, 13g.

In addition, in the above-described embodiment, the rear cross member 2 provided with the five kinds of regions different from each other in plate thickness dimension has been described. The aspect of the disclosure is not limited thereto and the rear cross member may be provided with four or less kinds of regions different from each other in plate thickness dimension and the rear cross member may be provided with six or more kinds of regions different from each other in plate thickness dimension. In addition, the disposition positions and the shapes of the regions are not limited those in the above-described embodiment and can be appropriately set.

In addition, in the above-described embodiment, a surface of the plate member W that is provided with the level difference portions 22, 23 is the surface on the inner side of the closed sectional structure of the rear cross member 2 and a flat surface of the plate member W is the surface on the outer side of the closed sectional structure of the rear cross member 2. The aspect of the disclosure is not limited thereto a surface of the plate member that is provided with the level difference portions may be the surface on the outer side of the closed sectional structure of the rear cross member and a flat surface of the plate member may be the surface on the inner side of the closed sectional structure of the rear cross member.

In addition, in the above-described embodiment, each of the front plate member W1 constituting the front side of the rear cross member 2 and the rear plate member W2 constituting the rear side of the rear cross member 2 is configured as a single member disposed over the entire width in the vehicle width direction. The aspect of the disclosure is not limited thereto and at least one of the plate members W1, W2 may be obtained by integrating a plurality of members through welding.

In addition, in the above-described embodiment, the front plate member W1 and the rear plate member W2 are welded to each other through butt welding such that the rear cross member 2 having the closed sectional structure is manufactured. The aspect of the disclosure is not limited thereto and the rear cross member 2 having the closed sectional structure may be manufactured through lap welding in which opening side edges of the front plate member W1 and the rear plate member W2 are welded to each other while being partially overlapped on each other.

The aspect of the disclosure can be applied to a cross member applied to a vehicle body frame of a frame structure and a method of manufacturing the cross member.

What is claimed is:

1. A cross member comprising a plate member with a predetermined sectional shape, the plate member constituting a portion of a vehicle body frame, extending in a vehicle width direction, and being formed of metal, wherein:
the plate member is provided with a level difference portion on a first surface of the plate member, and a cut mark portion on a second surface of the plate member, the second surface being on the opposite side of the first surface of the plate member; and
the plate member is provided with a thick plate portion on a first side of the plate member in a direction in which the plate member extends, and a thin plate portion on a second side of the plate member in the direction in which the plate member extends, with the level difference portion interposed between the first and second sides.

2. The cross member according to claim 1, wherein the cross member is positioned closest to a vehicle body rear side from among a plurality of cross members extending in the vehicle width direction and arranged at predetermined intervals in a vehicle body front-rear direction, and the cross member is provided with the thick plate portion and the thin plate portion.

3. The cross member according to claim 2, wherein:
the cross member positioned closest to the vehicle body rear side is provided with a towing connection portion in a central portion of the cross member in the vehicle width direction; and
the thick plate portion of the cross member is provided with the towing connection portion and a portion in a vicinity of the towing connection portion.

4. The cross member according to claim 2, wherein:
opposite outer portions of the cross member in the vehicle width direction are connected to a pair of right and left side rails extending in the vehicle body front-rear direction, the cross member being positioned closest to the vehicle body rear side; and
each of the opposite outer portions in the vehicle width direction is the thick plate portion.

5. The cross member according to claim 1, wherein the plate member is a single member disposed over an entire width in the vehicle width direction.

6. The cross member according to claim 1, wherein:
the cross member is configured to have a closed sectional structure;
the first surface of the plate member provided with the level difference portion is a surface on an inner side of the closed sectional structure; and
the second surface of the plate member provided with the cut mark portion is a surface on an outer side of the closed sectional structure.

7. The cross member according to claim 1, wherein a surface roughness at the cut mark portion of the second surface is different from a surface roughness at other portions of the second surface.

* * * * *